Figure 1:
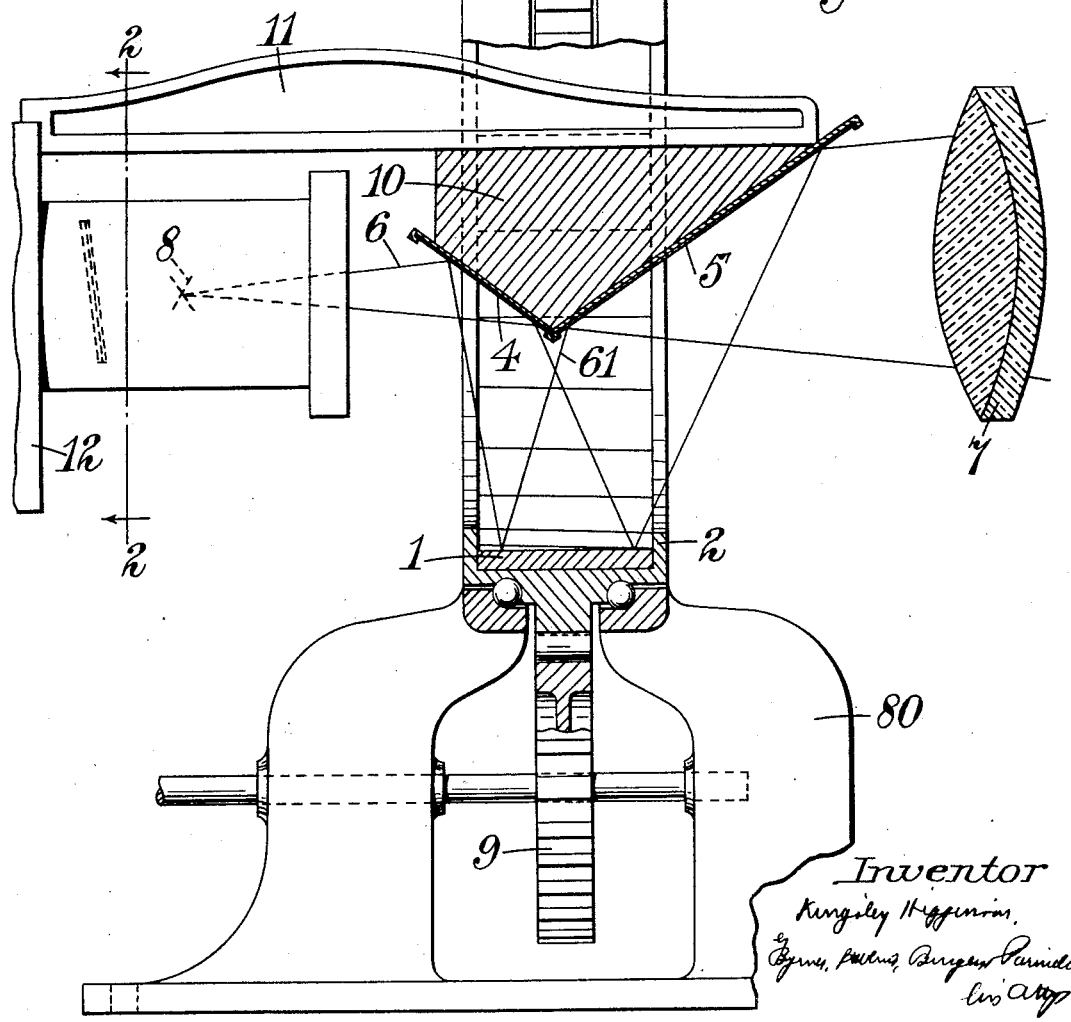

May 29, 1923.

K. HIGGINSON

CINEMATOGRAPHIC PROJECTION APPARATUS

Filed Jan. 6, 1921

Inventor
Kingsley Higginson

Patented May 29, 1923.

1,456,776

UNITED STATES PATENT OFFICE.

KINGSLEY HIGGINSON, OF KINGSTON-ON-THAMES, ENGLAND.

CINEMATOGRAPHIC PROJECTION APPARATUS.

Application filed January 6, 1921. Serial No. 435,356.

*To all whom it may concern:*

Be it known that I, KINGSLEY HIGGINSON, a subject of the King of England, residing in Kingston-on-Thames, Surrey, England, have invented certain new and useful Improvements in Cinematographic Projection Apparatus, of which the following is a specification.

This invention relates to cinematographic projection apparatus of the kind constructed to enable the film to be fed continuously through the gate instead of with a step-by-step motion. It is desirable to have a continuous movement of the film, partly because the feeding means that can be employed for such a movement are less apt to break the film and wear it at the perforations than means which produce a step-by-step feed. A further reason is found in the fact that where a step-by-step feed is employed an obturating shutter is necessary whereas with a continuous movement such a shutter may commonly be dispensed with, with the favourable result that the screen is more continuously, if not quite continuously, illuminated. In the endeavour to obtain a continuous movement of the film, proposals have been made to employ a series of mirrors arranged as the rim of a shallow dish-like structure mounted to rotate about an axis at right-angles to the plane of the bottom of the dish, and to interpose this series of mirrors in the path of the projected beam so as to intercept the images on the film and reflect them on to the screen. By suitably adjusting the speed of the mirrors with relation to that of the film-feed a stationary picture upon the screen may be obtained.

The present invention has been devised to obtain improved results with apparatus of the general kind thus proposed, some of which proposals, however, are such as to be quite impracticable. This invention therefore relates to that type of apparatus in which the film may be continuously moved through the gate and the images projected therefrom be received on to a series of mirrors of trapezoidal shape so disposed as facets in ring formation on a rotatable support that they constitute in effect a frustum of a pyramid, the axis of rotation of the support being the principal axis of the said pyramid; the mirrors can be continuously moved across the beam projected through the film in such a manner that each image falls upon only one of the said series of mirrors and when reflected therefrom upon the screen is stationary upon the screen.

By the present invention, in kinematograph apparatus of the type described there is combined with the ring of mirrors a reflector interposed at such an angle and in such a position in the path of the beam from the film to the ring that each mirror of the ring receives (for example through the smaller diameter opening of the ring) an image thus reflected whereof the measurement parallel to the direction of movement of the mirror is substantially equal to the corresponding measurement of the mirror itself at each point.

In one construction provided by this invention, the said reflector is so situated and arranged as to cause the beam after reflection by the ring to emerge from that side thereof which is opposite the side by which it enters and to cause the angle of incidence of the beam upon the ring measured with respect to the plane of rotation of the latter to be as small as is practicable while permitting the said direction of emergence. The object of this disposition of the parts is to reduce, as far as practicable, a flickering effect at the lateral edges of the picture upon the screen.

In order still further to secure favourable conditions of operation, this invention provides a construction wherein the film is so guided in the gate that its plane, when in the gate, is inclined to the optical axis of projection in the direction which decreases the inclination between its plane and the plane of the said interposed reflector.

A feature of this invention is such an arrangement of a reflector interposed between the film and the ring of mirrors that the plane containing the beams incident upon and reflected from the said ring contains or is substantially parallel to the axis of rotation of the ring.

Figure 2:
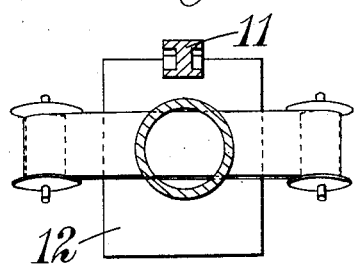

Figure 1 is a diagrammatic side elevation, partly in section, showing one arrangement of mirrors provided by this invention, the parts being arranged with a view to disturbing as little as possible, the customary disposition of the projector with relation to the screen; and Figure 2 is a vertical sectional elevation taken on the line II—II in Figure 1, as viewed in the direction of the body of the projector.

At 1 is indicated, in section, one of the mirrors of trapezoidal shape arranged as facets in a ring 2 carried by a support 80, and mounted for rotation about the axis 3 by means of a gear 9, but it may be rotated in any convenient manner and as required in apparatus of the type to which this invention relates.

Two fixed plane reflectors 4 and 5 are provided as shown, disposed more or less within the embrace of the ring 2. These reflectors are mounted on a block 10 carried by an arm 11 fixed to the projector 12. The reflector 4 is directed towards the objective of the projector and is carried on its stationary mount at such an angle that the divergent beam received by it and thrown on to the facet 1 shall, upon reflection at 1, just clear the end of the reflector 4 that is more remote from the projector. Thus it will be seen that the upper boundary ray 6 of the beam proceeding from the projector after reflection at 4 and at 1 just misses at 61 the said remote end of the reflector 4.

The parts are so arranged that the beam after reflection at 4 just fills the facet 1 as to the dimensions of the latter measured in the direction of its rotatory movement with an image of the picture. The image, as will be obvious, is trapezoidal in shape as it falls upon the facet 1. The arrangement by which the ray at 61 only just clears the edge of the reflector 4, ensures that the general incidence of the beam upon the facet 1 is as near to 90° as possible, which result is desirable both in order that the said trapezoidal form shall depart as little as possible from a rectangle and also to minimize flickering at the corresponding, that is to say the lateral, edges of the picture upon the screen.

It is not necessary that the facet shall be filled to the other two edges, that is to say, those seen to the right and left in the diagram, but the parts are so adjusted that in the filling of the facet to the first said two edges, that is to say the inclined edges, the small black divisions ordinarily occurring on the film between successive pictures shall fall upon the lines of junction of a facet with its neighbours.

The reflector 5 serves to receive the images reflected from 1 and throw them on to the screen in such a way that the central line of the beam falling upon the screen is parallel with the centre line of the beam falling from the projector on to the reflector 4.

In the projector, the gate is so constructed as to be slightly inclined to the optical axis of projection, the direction of its inclination being such as to decrease the angle between the film, when at the gate, and the said first reflector 4 interposed between the projector and the ring.

Between the reflector 5 and the screen a lens indicated diagrammatically at 7, additional to the objective lens on the projector, may be provided. The lens 7 and the objective lens on the projector are constructed, as those skilled in the art can readily do, to be so mutually complementary that focussing can be effected by the lens 7. This enables the screen to be placed at varying distances from the projector without disturbing the mutual situation of the projector and mirrors 1, 4 and 5 with relation to one another. The point 8 may be taken as the point within the objective on the projector to which the beam emerging from the projector converges, and from which it diverges as indicated in the drawing.

The object of arranging the parts so that the plane which contains the beams incident upon and reflected from the ring of mirrors contains or is parallel to the axis of rotation of the latter, is to cause the oblique reflections which reach the screen to occur at the vertical edges of the pictures or at least at those edges which are parallel to the direction of movement of the film. This selection for the location of the oblique reflections, (since some such reflections are inevitable), is desirable because when thus located they are more amenable to correction, that is to say to reduction in degree of obliquity than if they occurred at the other pair of opposite edges.

It will be appreciated that, in practice, the joint between each pair of consecutive mirrors will occupy some space, for example about one one-hundredth of an inch. This is not altogether undesirable, since it affords some latitude not only to receive the images of the black gaps between consecutive pictures on the film, but also to accommodate slight irregularities in the film and mirrors.

It is to be understood that the lens system of the projector and the projector itself may be of any ordinary construction and they are therefore not indicated in the drawing; it is, however, to be borne in mind that in the preferred construction the gate of the projector lens is inclined as above described and its objective is designed to co-operate with the lens at 7 as above described.

What I claim as my invention and desire to secure by Letters Patent is:—

1. For use with a kinematograph projector wherein the film can be moved continuously through the gate, the combination with a plurality of mirrors each of trapezoidal form mounted side by side to form an annulus with each of the mutually inclined sides of a mirror adjacent to one of the mutually inclined sides of its neighbor, means to support the annulus in the path of a beam from the projector and so that the general plane of the annulus is transverse to the said beam and means to rotate the annulus about an axis that is transverse to the general plane thereof, of a reflector so disposed as to intercept the beam from the projector and so inclined as to throw it on to a mirror of the annulus to be reflected thereby and to form on the mirror an intersection of the beam that is trapezoidal and of the same size between the mutually inclined sides as that of the mirror between its mutually inclined sides.

2. For use with a kinematograph projector wherein a film can be moved continuously through the gate, the combination with a plurality of mirrors each of trapezoidal form mounted side by side to form an annulus with each of the mutually inclined sides of a mirror adjacent to one of the mutually inclined sides of its neighbor, means to support the annulus in the path of a beam from the projector and so that the general plane of the annulus is transverse to the said beam and presents the smaller opening of the annulus toward the projector, and means to rotate the annulus about an axis that is transverse to the general plane thereof, of a reflector so disposed as to intercept the beam from the projector and so inclined as to throw it on to a mirror of the annulus to be reflected thereby and to form on the mirror an intersection of the beam that is trapezoidal and of the same size between the mutually inclined sides as that of the mirror between its mutually inclined sides.

3. For use with a kinematograph projector wherein a film can be moved continuously through the gate, the combination with a plurality of mirrors each of trapezoidal form mounted side by side to form an annulus with each of the mutually inclined sides of a mirror adjacent to one of the mutually inclined sides of its neighbor, means to support the annulus in the path of a beam from the projector and so that the general plane of the annulus is transverse to the said beam, and means to rotate the annulus about an axis that is transverse to the general plane thereof, of a reflector extending into the embrace of the annulus not more than half way across the same which reflector is so disposed as to intercept the beam from the projector and so inclined as to throw it on to a mirror of the annulus to make an angle only sufficiently less than 90° with the mirror to ensure that the reflected beam just clears the reflector and to form on the mirror an intersection of the beam that is trapezoidal and of the same size between the mutually inclined sides as that of the mirror between its mutually inclined sides.

4. For use with a kinematograph projector wherein a film can be moved continuously through the gate, the combination with a plurality of mirrors each of trapezoidal form mounted side by side to form an annulus with each of the mutually inclined sides of a mirror adjacent to one of the mutually inclined sides of its neighbor, means to support the annulus in the path of a beam from the projector and so that the general plane of the annulus is transverse to the said beam, and means to rotate the annulus about an axis that is transverse to the general plane thereof, of a reflector extending into the embrace of the annulus not more than half way across the same and supported in such a position and so inclined as to intercept the beam from the projector and throw it on to a mirror of the annulus to make an angle only sufficiently less than 90° with the mirror to ensure that the reflected beam just clears the reflector and to form on the mirror an intersection of the beam that is trapezoidal and of the same size between the mutually inclined sides as that of the mirror between its mutually inclined sides, and a second reflector supported to extend within the embrace of the annulus so as to receive the beam reflected from the mirror and throw it in a direction substantially parallel to that of the beam emerging from the projector.

5. For use with a kinematograph projector wherein a film can be moved continuously through the gate, the combination with a plurality of mirrors each of trapezoidal form mounted side by side to form an annulus with each of the mutually inclined sides of a mirror adjacent to one of the mutually inclined sides of its neighbor, means to support the annulus in the path of a beam from the projector and so that the general plane of the annulus is transverse to the said beam, and means to rotate the annulus about an axis that is transverse to the general plane thereof, of a reflector supported between the projector and the annulus in such a position and so inclined as to intercept the beam from the projector and throw it on to a mirror of the annulus to form on the mirror an intersection of the beam that is trapezoidal and of the same size between the mutually inclined sides as that of the mirror between its mutually inclined sides, and refractive focussing means to receive and transmit the beam reflected from the mirror.

6. In kinematograph apparatus, the combination of a projector wherein a film can be moved continuously through the gate of the projector and said gate is constructed to incline the film to the optical axis of the projector at the gate, a plurality of mirrors each of trapezoidal form mounted side by side to form an annulus with each of the mutually inclined sides of a mirror adjacent to one of the mutually inclined sides of its neighbor, means to support the annulus in the path of a beam from the projector and so that the general plane of the annulus is transverse to the said beam, means to rotate the annulus about an axis that is transverse to the general plane thereof, and a reflector supported between the projector and the annulus in such a position and so disposed as to intercept the beam from the projector and throw it on to a mirror of the annulus to form on the mirror an intersection of the beam that is trapezoidal and of the same size between the mutually inclined sides as that of the mirror between its mutually inclined sides, the plane of the film in the gate being inclined to the optical axis of projection in the direction which decreases the inclination between its plane and the plane of the said reflector.

7. For use with a kinematograph projector wherein the film can be moved continuously through the gate, the combination with a plurality of mirrors each of trapezoidal form mounted side by side to form an annulus with each of the mutually inclined sides of a mirror adjacent to one of the mutually inclined sides of its neighbor, means to support the annulus in the path of a beam from the projector and so that the general plane of the annulus is transverse to the said beam, and means to rotate the annulus about an axis that is transverse to the general plane thereof, of a reflector so interposed in the path of the beam on its way to the said mirror as to reduce the angle of incidence of the beam upon the mirror.

8. For use with a kinematograph projector wherein the film can be moved continuously through the gate, the combination with a plurality of mirrors each of trapezoidal form mounted side by side to form an annulus with each of the mutually inclined sides of a mirror adjacent to one of the mutually inclined sides of its neighbor, means to support the annulus in the path of a beam from the projector and so that the general plane of the annulus is transverse to the said beam, and means to rotate the annulus about an axis that is transverse to the general plane thereof, of a reflector so interposed in the path of the beam on its way to the said mirror as to reduce the angle of incidence of the beam upon the mirror substantially to the smallest angle that will permit the beam, after reflection at the mirror, to clear the said reflector.

In testimony whereof I affix my signature.

KINGSLEY HIGGINSON.